US012022962B2

(12) United States Patent
Kim

(10) Patent No.: US 12,022,962 B2
(45) Date of Patent: Jul. 2, 2024

(54) PROTECTION NET APPARATUS FOR BABY CHAIR

(71) Applicant: Dong Jin Kim, Los Angeles, CA (US)

(72) Inventor: Dong Jin Kim, Los Angeles, CA (US)

( * ) Notice: Subject to any disclaimer, the term of this patent is extended or adjusted under 35 U.S.C. 154(b) by 128 days.

(21) Appl. No.: 17/987,592

(22) Filed: Nov. 15, 2022

(65) Prior Publication Data
US 2024/0156280 A1 May 16, 2024

(51) Int. Cl.
*A47D 15/00* (2006.01)
*A47D 1/00* (2006.01)
*F16B 2/24* (2006.01)

(52) U.S. Cl.
CPC ............ *A47D 15/00* (2013.01); *A47D 1/008* (2013.01); *F16B 2/245* (2013.01)

(58) Field of Classification Search
CPC ................................................. Y10T 24/202
See application file for complete search history.

(56) References Cited

U.S. PATENT DOCUMENTS

| | | | | |
|---|---|---|---|---|
| 3,959,854 A * | 6/1976 | Lewis | ................. | A47B 13/086 5/493 |
| 4,298,228 A * | 11/1981 | Zampino | ............. | A47D 1/0085 297/182 |
| 4,659,143 A * | 4/1987 | MacLennan | ........... | A47D 1/106 297/174 CS |
| 4,848,834 A * | 7/1989 | Linski | ...................... | A47D 1/00 297/182 |
| 5,088,677 A * | 2/1992 | Chandler | ............... | A47B 23/06 248/316.7 |
| 8,469,322 B1 * | 6/2013 | Oxley | .................... | F21V 21/00 362/147 |
| 9,706,856 B1 * | 7/2017 | Nevitt | ...................... | F16B 1/00 |
| 10,470,500 B2 | 11/2019 | Kim | | |
| 2013/0140416 A1 * | 6/2013 | West | ...................... | F24S 25/20 248/231.81 |
| 2014/0007409 A1 * | 1/2014 | Trifari, Jr. | ............ | B65F 1/1468 403/220 |
| 2016/0331152 A1 * | 11/2016 | Wells | ................... | A47D 1/0083 |
| 2018/0245733 A1 * | 8/2018 | Felt | ....................... | F21V 21/088 |
| 2019/0000151 A1 * | 1/2019 | Kim | ..................... | A47D 15/006 |

* cited by examiner

*Primary Examiner* — David E Allred

(57) ABSTRACT

The present invention provides a protection net apparatus fixed to a baby chair having a tray, comprises: a plurality of net supporting parts fixed to different positions of the tray and each including a clamp portion fixing the net supporting part to the tray; and a supporting rod portion coupled to the clamp portion and extending outwards; a net part including a net with an edge having an inner edge, an outer edge located on an opposite side of the inner edge, and lateral edges each connecting between ends of the inner edge and the outer edge; and a receiving pocket attached to the net on an outer edge portion adjacent to the outer edge in a direction that an opening of the receiving pocket heads toward the inner edge and receiving a top end of the supporting rod portion through the opening.

20 Claims, 13 Drawing Sheets

PROTECTION NET APPARATUS FOR BABY CHAIR

FIELD OF THE INVENTION

The present invention relates to a baby care item, or more specifically, to a baby care item mounted on a baby chair that can prevent objects from falling on the ground to improve baby hygiene.

BACKGROUND OF THE INVENTION

Since a baby's immune system is not fully developed, it is essential to clean and sanitize baby objects and environments to maintain hygiene. Exposure to dirt, pet dander, and household germs may affect babies to develop serious diseases.

Meanwhile, a baby chair is a specialized chair with a small tray and widely used for feeding babies. While babies sit on the baby chairs, it is very common that they drop their toys or spoons on the floor or ground. Unless dropped items are sanitized to remove the germs every time, they are likely to be sources of germs which can infect babies. Accordingly, it is necessary to prevent the baby's objects from falling on the floor.

In order to solve the problem mentioned above, Applicant of the present invention has devised the U.S. Pat. No. 10,470,500, titled "Protection Net on Which a Purse or a Bib Is Attached," filed on Nov. 12, 2019. The protection net disclosed on this patent is configured to prevent a baby's objects from falling on the ground by fixing one side thereof to a baby chair and the other side thereof to a separate table which may be located in front of the baby.

Although the structure disclosed on this patent can prevent objects' falling to the ground, it can be installed and used only when the baby chair is in front of the table. Therefore, Applicant has devised a novel protection net that can be fixed only to a baby chair and used independently without using other furniture or supports.

SUMMARY OF THE INVENTION

According to one embodiment of the present invention, a protection net apparatus for a baby chair having a tray, comprising: a plurality of net supporting parts fixed to different positions of the tray of the baby chair and each including: a clamp portion fixing the net supporting part to the tray; and a supporting rod portion coupled to the clamp portion and extending outwards; and a net part including: a net with an edge having an inner edge, an outer edge located on an opposite side of the inner edge, and lateral edges each connecting between ends of the inner edge and the outer edge; and a receiving pocket attached to a surface of the net on an outer edge portion adjacent to the outer edge in a direction that an opening of the receiving pocket heads toward the inner edge and receiving a top end of the supporting rod portion through the opening, wherein the net part is mounted on the supporting rod portions by engaging a top end of the supporting rod portion with the receiving pocket and is spread from the supporting rod portion to the tray.

In addition, the clamp portion may include: a body having a U shape and clamping the tray through an opening of the U shape; a handle connected to a bottom of the body and protruding from the body in an opposite direction to the opening of the U shape; and a base portion extended from a bottom end of the supporting rod portion, connected to a top of the body, and protruding from the body toward in a same direction as the opening, thereby providing a fixing force to the supporting rod portion by resting against a surface of the tray.

In addition, the base portion and the supporting rod portion may be one body made of stainless steel.

In addition, the tray may have a top surface portion on which objects are laid out and a side wall portion protruding downwards from an edge of the top surface portion, wherein the body clamps the side wall portion from a bottom of the side wall portion in a direction where the handle is positioned to be an inner side of the side wall portion and the base portion is positioned to be an outer side of the side wall portion, wherein the base portion is configured to be substantially parallel to a surface of the side wall portion of the tray, and an angle between the base portion and the supporting rod portion ranges between 0 and 90 degree.

In addition, an angle between the base portion and the supporting rod portion of at least one of the net supporting parts may be different from that between the base portion and the supporting rod portion of another one of the net supporting parts.

In addition, a length of the supporting rod portion of at least one of the net supporting parts may be different from that of the supporting rod portion of another one of the net supporting parts.

In addition, the protection net may further comprise an edge member that is attached to an edge portion of the net along the edge in a state where the edge portion is folded in a substantially perpendicular direction to the edge.

In addition, a first length of the edge of the net in a folded state may be same as that of the edge member, and a second length of the edge of the net in an unfolded state is longer than that of the edge member, wherein a first area of the net in the folded state is substantially same as that defined by the inner edge member, the outer edge member, and the lateral edge members, and a second area of the net in the unfolded state is larger than that defined by the inner edge member, the outer edge member, and the lateral edge members.

In addition, the edge member may include an inner edge member attached to an inner edge portion adjacent to the inner edge, an outer edge member attached to the outer edge portion adjacent to the outer edge, and lateral edge members each attached to a lateral edge portion adjacent to the lateral edge, wherein a length of the outer edge member is longer than that of the inner edge member.

In addition, the edge member may be made of a rubber based material having elasticity.

In addition, at least one of net supporting parts may have different shapes from the others with respect to at least one of an angle of the supporting rod portion from the clamp portion and a length of the supporting rod portion.

In addition, the protection net apparatus may further comprise a connecting part that includes a string each end connected to each of the lateral edges of the net and that provides tension to the net by being installed behind a back of the baby chair that is positioned opposite to the tray of the baby chair.

According to another embodiment of the present invention, a protection net apparatus fixed to a baby chair having a tray, comprises: a plurality of net supporting parts fixed to different positions of the tray and each including: a clamp portion fixing the net supporting part to the tray and including: a body having a U shape and clamping the tray through an opening of the U shape; a handle connected to the body and protruding from the body in an opposite direction to the opening; and a base portion connected to the body, protruding from the body toward in a same direction as the opening, and resting against the tray; and a supporting rod portion coupled to and extended from the clamp portion outwards and fixed at one position by a fixing force provided by the base portion; and a net part including: a net with an edge; an edge member attached to an edge portion of the net along the edge in a state where the edge portion is folded in a substantially perpendicular direction to the edge; and a receiving pocket attached to an outer edge portion of the edge portion in a direction that an opening of the receiving pocket heads toward an inner edge portion located on an opposite side of the outer edge portion and receiving the supporting rod portion through the opening; and a connecting part that includes a string each end connected to each of the lateral edges of the net and provides tension to the net by being installed behind a back of the baby chair that is positioned opposite to the tray.

In addition, the tray may have a top surface portion on which objects are laid out and a side wall portion protruding downwards from an edge of the top surface portion, wherein the body clamps the side wall portion from a bottom of the side wall portion in a direction where the handle is positioned to be an inner side of the side wall portion and the base portion is positioned to be an outer side of the side wall portion, wherein the base portion is configured to be substantially parallel to a surface of the side wall portion of the tray, and an angle between the base portion and the supporting rod portion ranges between 0 and 90 degree.

In addition, a first length of the edge of the net in a folded state may be same as that of the edge member, and a second length of the edge of the net in an unfolded state is longer than that of the edge member.

In addition, a first area of the net in the folded state is substantially same as that defined by the inner edge member, the outer edge member, and the lateral edge members, and a second area of the net in the unfolded state is larger than that defined by the inner edge member, the outer edge member, and the lateral edge members.

In addition, the edge member may include an inner edge member attached to the inner edge portion, an outer edge member attached to the outer edge portion, and lateral edge members attached to a lateral edge portion between the inner and the outer edge portion, wherein a length of the outer edge member is longer than that of the inner edge member.

In addition, the edge member may be made of a rubber based material having elasticity.

In addition, at least one of net supporting parts may have different shapes from the others with respect to at least one of an angle of the supporting rod portion from the clamp portion and a length of the supporting rod portions from the clamp portion.

BRIEF DESCRIPTION OF THE DRAWINGS

FIG. 6A shows an angle of the supporting rod portion 101S from the clamp portion 101F. FIG. 6B shows a length of the supporting rod portion 101S from clamp portion 101F.

DETAILED DESCRIPTION EMBODIMENTS OF THE INVENTIONS

Hereinafter, preferred embodiments according to the present invention will be described in detail in conjunction with the accompanying drawings.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

In addition, as used in the specification including the appended claims, the singular forms "a," "an," and "the" include the plural, and reference to a particular numerical value includes at least that particular value, unless the context clearly dictates otherwise.

The features and attendant advantages of the present invention, as well as the solutions to achieve said features and advantages, will become clearer when considered in conjunction with the accompanying drawings and the real-life examples described hereafter. The present invention, however, is not limited to the real-life examples mentioned below; rather, the invention will be realized in various disparate ways. The technical features of the present invention will be explicated in detail below, accompanied by the attached figures.

Figure 1:
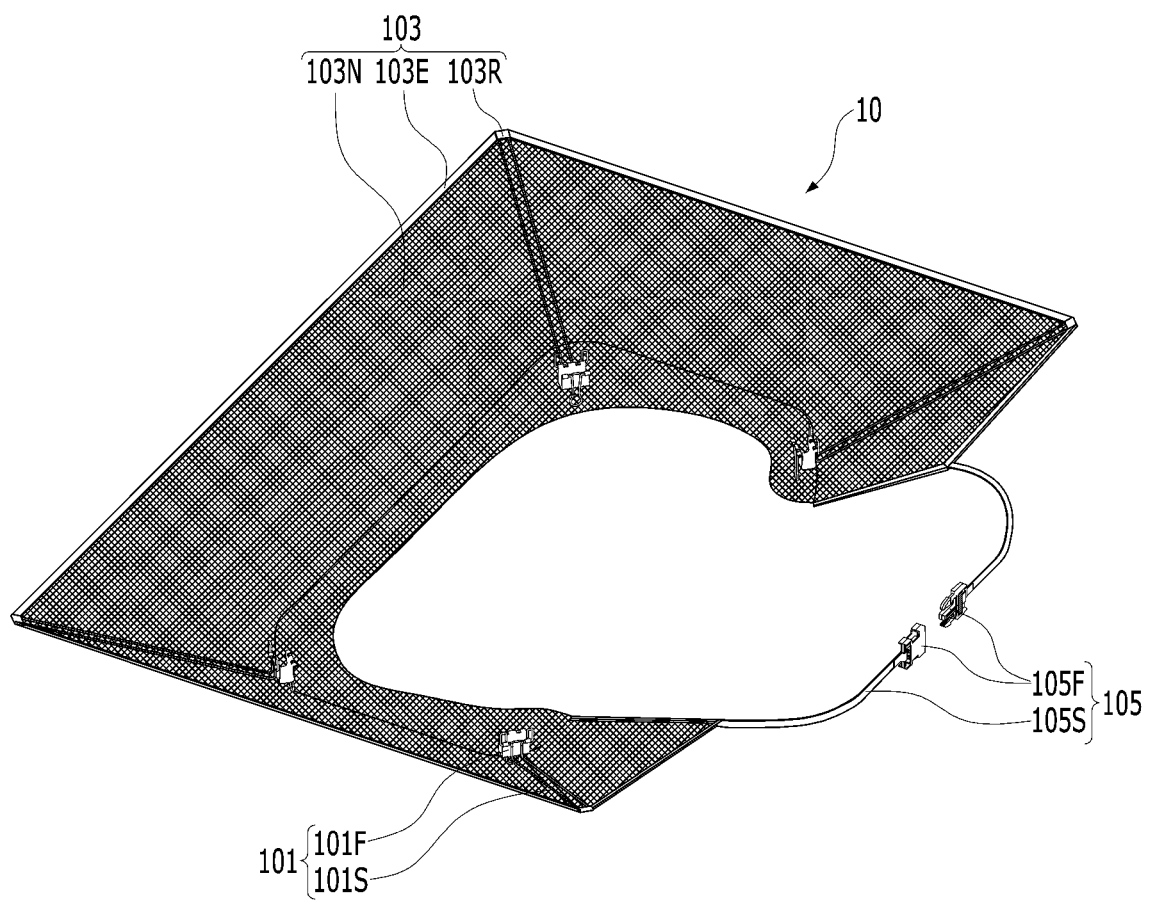
FIG. 1 is a perspective view schematically illustrating a protection net apparatus 10 according to an embodiment of the present invention.
Figure 2:
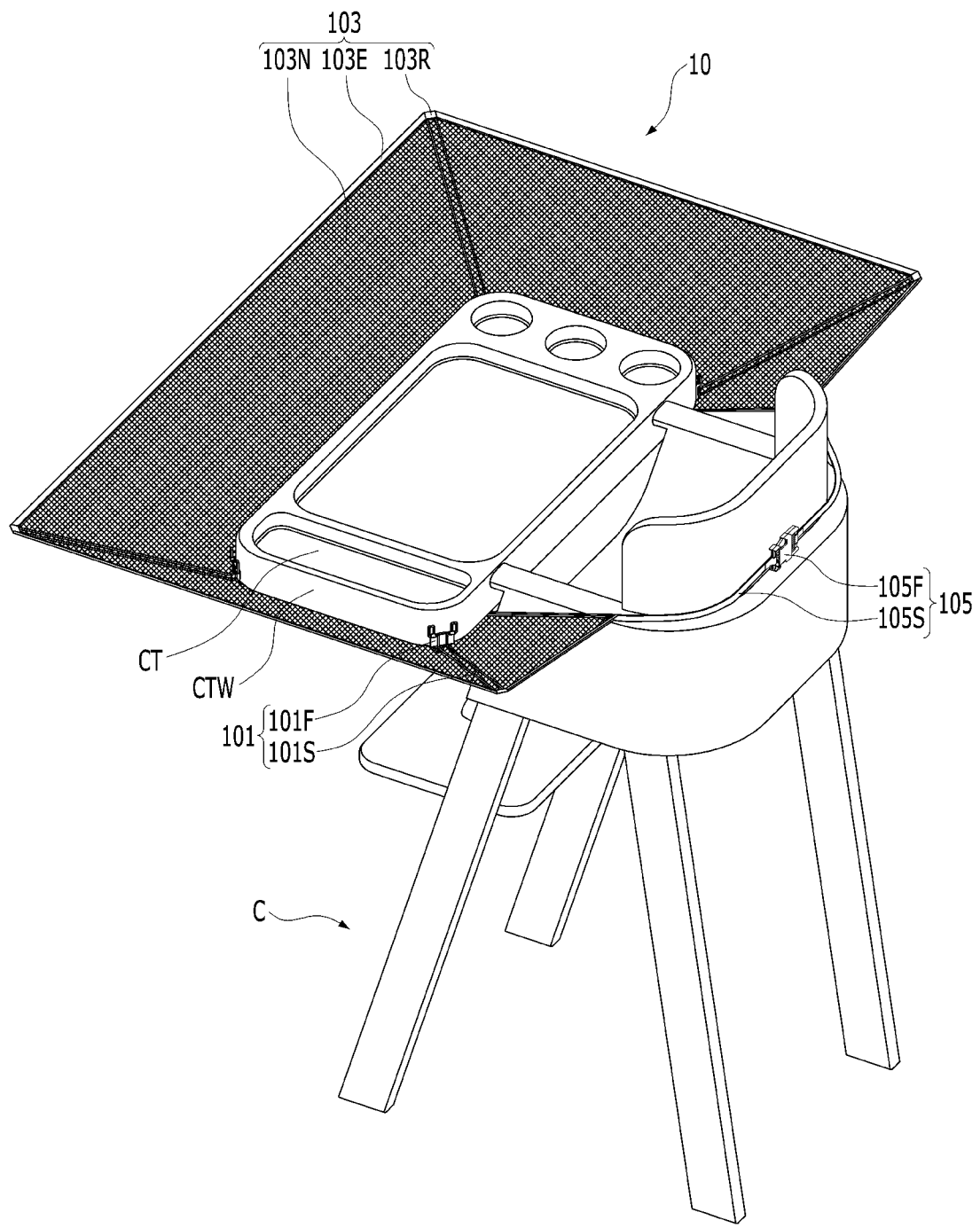
FIG. 2 is a perspective view schematically illustrating the protection net apparatus 10 of FIG. 1 in a fixed state to a tray CT of a baby chair C.

FIG. 1 is a perspective view schematically illustrating a protection net apparatus 10 according to an embodiment of the present invention. FIG. 2 is a perspective view schematically illustrating the protection net apparatus 10 of FIG. 1 in a fixed state to a tray CT of a baby chair C.

Referring to FIGS. 1 and 2, the protection net apparatus 10 comprises: a plurality of net supporting parts 101 fixed to different positions of the tray CT of the baby chair C and extending outwards; a net part 103 mounted on an outwardly extended end of the net supporting part 101 and is spread from the top end of the net supporting part 101 to the tray CT, and a connecting part 105 connected to both lateral edges of the net part 103 and installed behind a back of the baby chair C to provide tension to the net part 103. Accordingly, the net part 103 surrounds an edge of the tray CT and thus can prevent objects, which a baby sitting the chair C drops or throws, from falling to the floor or ground.

The detailed structure of the net supporting part 101 will be described below referring to FIGS. 3 to 6B, and that of the net part 103 will be described below referring to FIGS. 7A to 10B.

Figure 3:
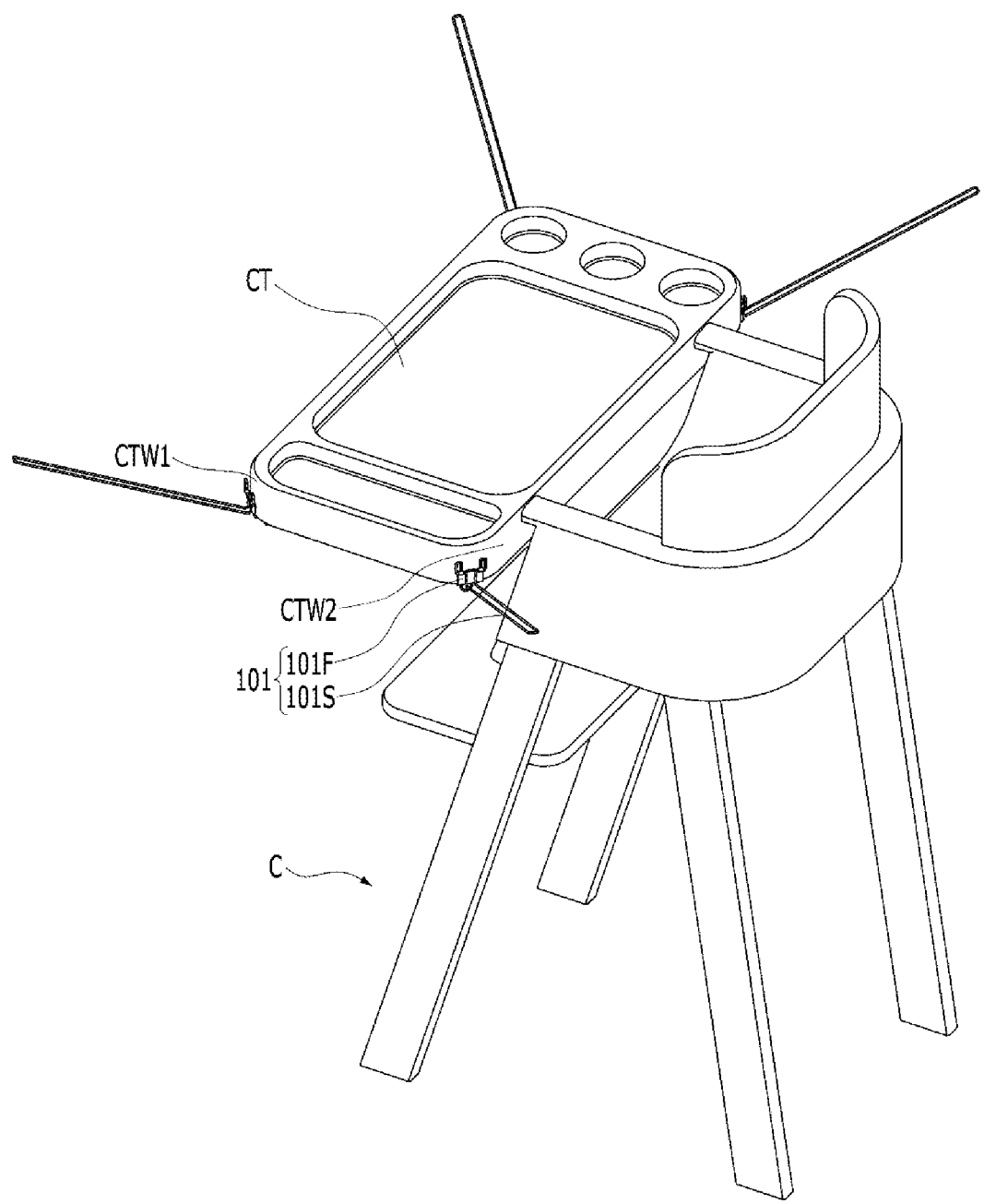
FIG. 3 is a perspective view schematically illustrating a plurality of net supporting parts 101 of the protection net apparatus 10 of FIG. 1 in a fixed state to a tray CT of a baby chair C.
Figure 4:
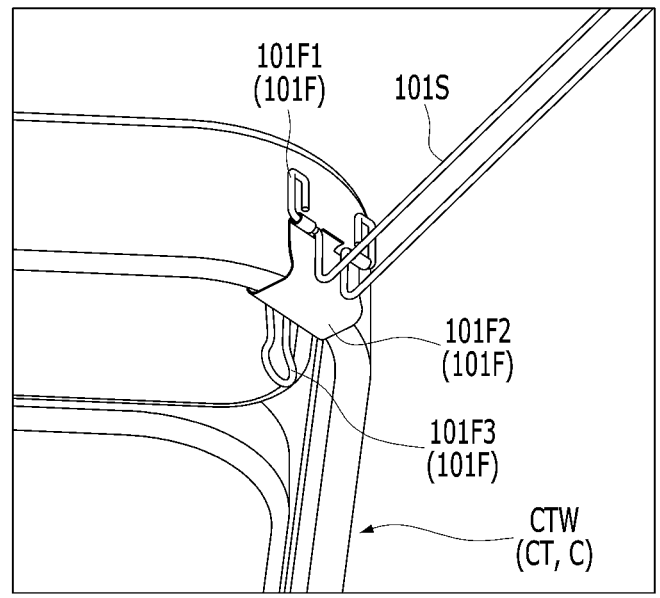
FIGS. 4 and 5 are magnified bottom perspective views from the outside and the inside, each illustrating a clamp portion 101F of the net supporting part 101 of FIG. 1 in a fixed state to the tray CT of the baby chair C.
Figure 5:
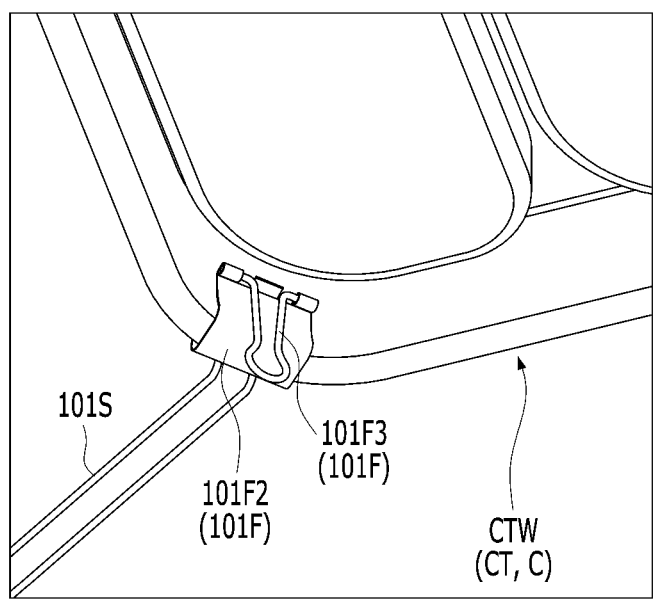
Figure 6A:
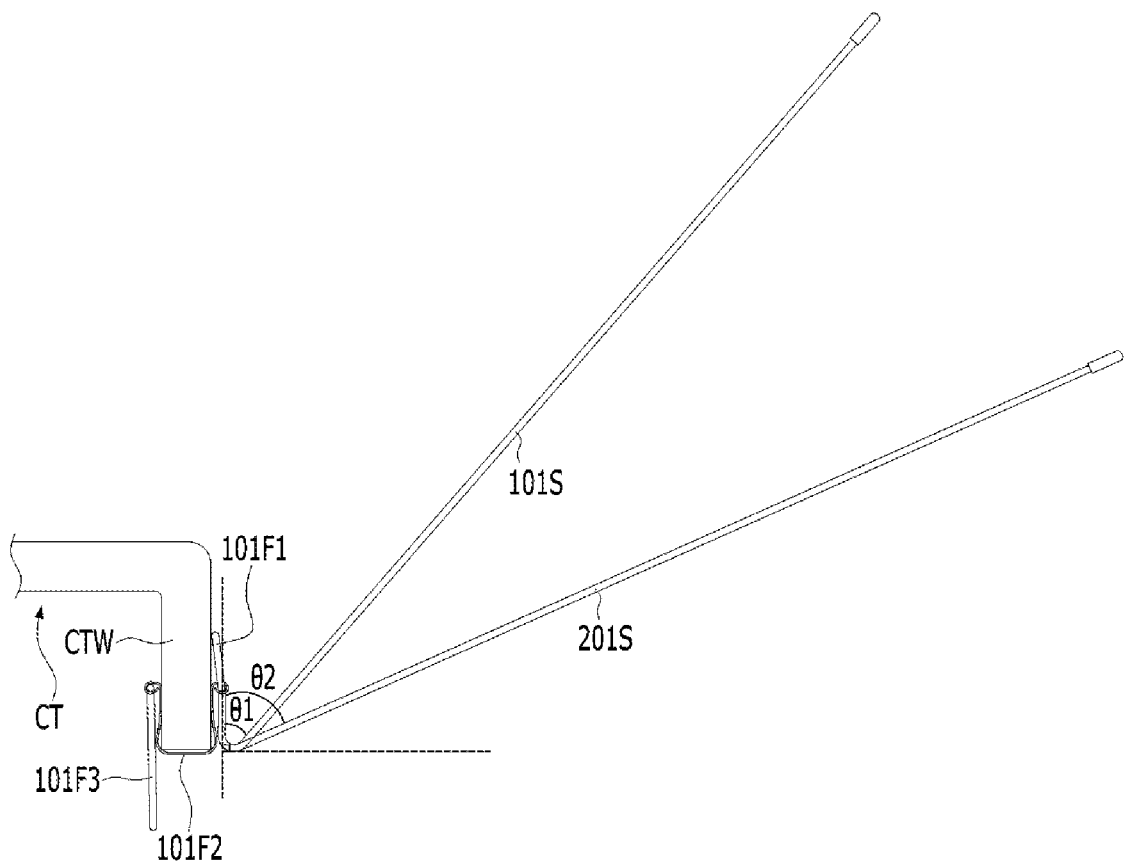
FIGS. 6A and 6B are cross sectional views illustrating the clamp portion 101F and the supporting rod portion 101S of FIG. 1 in a fixed state to the tray CT of the baby chair C.
Figure 6B:
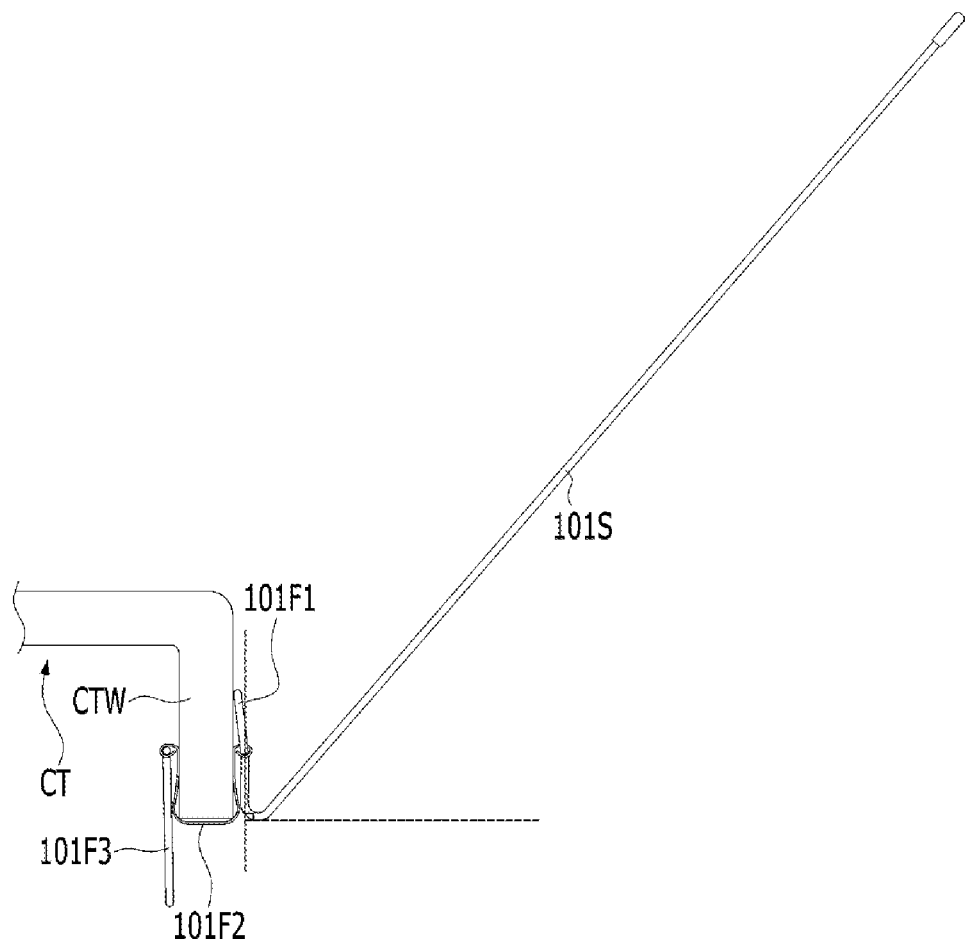
Figure 6B:
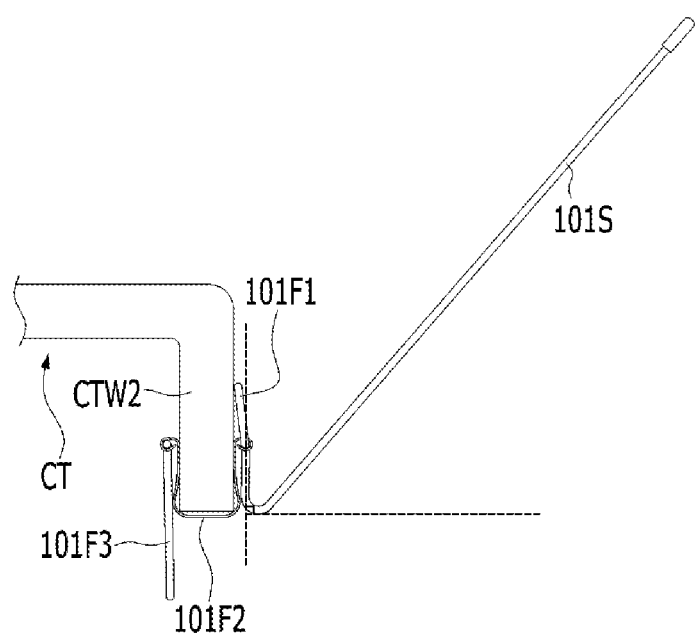

FIG. 3 is a perspective view schematically illustrating a plurality of net supporting part 101 of the protection net apparatus 10 of FIG. 1 in a fixed state to a tray CT of a baby chair C. FIGS. 4 and 5 are magnified bottom perspective views from the outside and the inside, each illustrating a clamp portion 101F of the net supporting part 101 of FIG. 1 in a fixed state to the tray CT of the baby chair C. FIGS. 6A and 6B are cross sectional views illustrating the clamp portion 101F and the supporting rod portion 101S of FIG. 1 in a fixed state to the tray CT of the baby chair C. FIG. 6A shows an angle of the supporting rod portion 101S from the clamp portion 101F. FIG. 6B shows a length of the supporting rod portion 101S from clamp portion 101F.

Referring to FIGS. 3 to 6B, the net supporting part 101 includes: a clamp portion 101F fixing the net supporting part 101 to the tray CT and a supporting rod portion 101S coupled to the clamp portion 101F and extending outwards with a certain angle.

The clamp portion 101F may include: a body 101F2 having a U shape and clamping the tray CT through an opening of the U shape; a handle 101F3 connected to a bottom of the body 101F2 and protruding from the body 101F2 in an opposite direction to the opening of the U shape; and a base portion 101F1 extended from a bottom end of the supporting rod portion 101S, connected to a top of the body 101F2, protruding from the body 101F2 toward in a same direction as the opening, and resting against a top surface of the tray CT to provide a fixing force to the supporting rod portion 101S.

In some embodiments, the tray CT of the baby chair C may have a top surface portion on which food or objects are laid out and a side wall portion CTW protruding downwards from the edge of the top surface portion of the tray CT. In this case, the body 101F2 of the clamp portion 101F may clamp the side wall portion CTW from the bottom of the side wall portion CTW in a direction where the handle 101F3 is positioned to be an inner side of the wall portion CTW and the base portion 101F1 is positioned to be an outer side of the wall portion CTW.

In this case, as shown in FIG. 6A, the base portion 101F1 may be configured to be substantially parallel to a surface of the side wall portion CTW, and an angle θ1 between the base portion 101F1 and the supporting rod portion 101S ranges between 0 and 90 degree. Preferably, the angle θ1 between the base portion 101F1 and the supporting rod portion 101S may be approximately 20 degree, and thus, an angle between the supporting rod portion 101S and the ground may be approximately 70 degree. Accordingly, the net part 103 may be formed like an extended area or an outwardly inclined wall surrounding the edge of the tray CT.

In FIG. 6A, the angle θ1 of the supporting rod portion 101S is illustrated to be approximately 20 degree from the base portion 101F1, but the present invention is not limited thereto. The angle θ2 between the base portion 101F1 and the supporting rod portion 101S of the net supporting part 101 may be bigger or smaller than 20 degree as the net supporting part 201 shown in FIG. 6A.

Meanwhile, a length of the supporting rod portion 101S may range from 3.0 inches to 10.0 inches but is not limited thereto. The length of the supporting rod portion 101S may be chosen by need of a user and may be shorter than 3.0 inches or longer than 10.0 inches.

The base portion 101F1 and the supporting rod portion 101S may be one body 101F2 made of stainless steel. The base portion 101F1 and the supporting rod portion 101S may be manufactured by bending a piece of stainless steel line or wire to form a specific angle between the base portion 101F1 and the supporting rod portion 101S, such as a first angle θ1 or a second angle θ2 shown in FIG. 6. Meanwhile, the body 101F2 and the handle 101F3 may be obtained from a commercial binder clip of which one handle is removed. In this case, the base portion 101F1 is connected to a space where the removed handle 101F3 had been connected.

As mentioned above, the protection net apparatus 10 may have a plurality of the net supporting parts 10, and the net supporting parts 101 may be at least three. In this case, at least one of the net supporting part 101 may be located on a front portion of the tray CT, and at least two of the net supporting part 101 are respectively located on both side portions of the tray CT to improve fall protection effects.

In some embodiments, at least one of the plurality of the net supporting parts 101 has different shapes from the others with respect to at least one of an angle of the supporting rod portion 101S from the clamp portion 101F and a length of the supporting rod portion 101S.

For example, an angle between the base portion 101F1 and the supporting rod portion 101S of the net supporting part 101 located on a front portion of the tray CT may be different from that between the base portion 101F1 and the supporting rod portion 101S of the net supporting part 101 located on a side portion of the tray CT.

In addition, as shown in FIGS. 3 and 6B, a length of the supporting rod portion 101S of the net supporting part 101 located on a front side wall portion CTW1 may be different from that of the supporting rod portion 101S of the net supporting part 101 located on a lateral side wall portion CTW2. For example, a length of the supporting rod portion 101S of the net supporting part 101 located on a front side wall portion CTW1 may be longer than that of the supporting rod portion 101S of the net supporting part 101 located on a lateral side wall portion CTW2, but the present invention is not limited thereto.

Meanwhile, the clamp portion 101F described above is one embodiment of the present invention and is not limited thereto. The clamp portion 101F may be other structures having a clamping function and a supporting function with a fixable support.

Figure 7A:
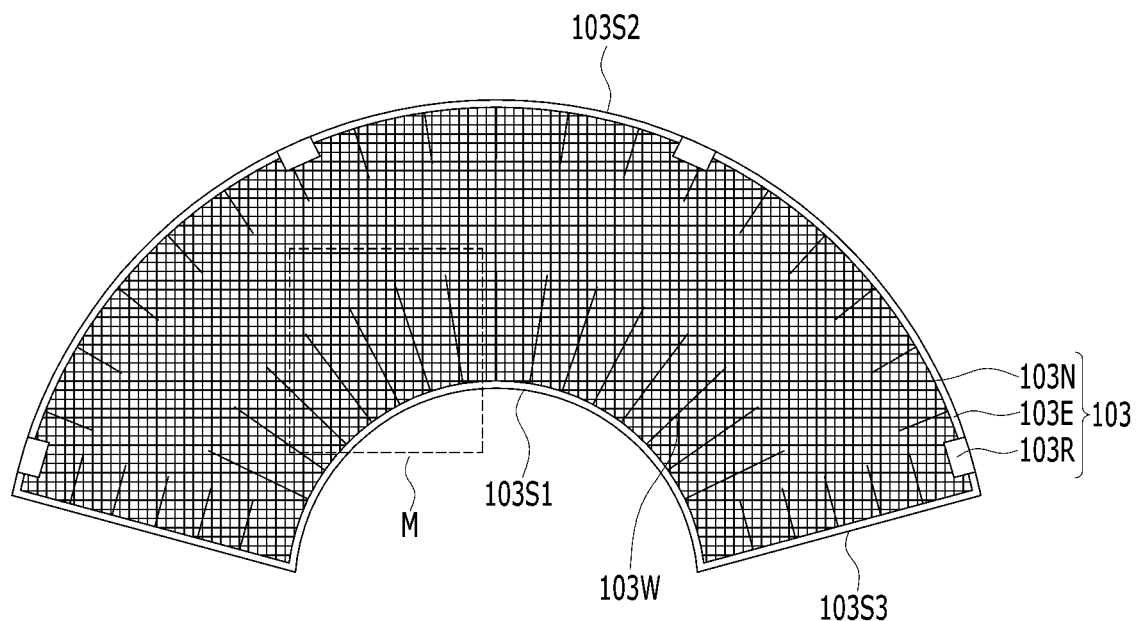
FIGS. 7A and 7B are front and bottom views schematically illustrating a net part 103 of the protection net apparatus 10 of FIG. 1 in a state where the net part 103 is spread out on a plane.
Figure 7B:
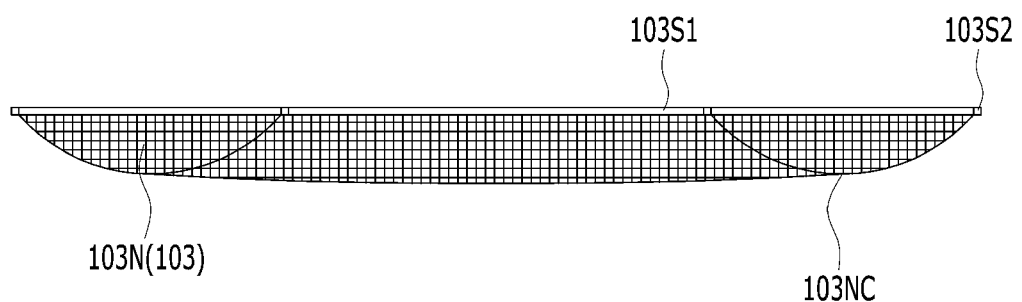
Figure 8:
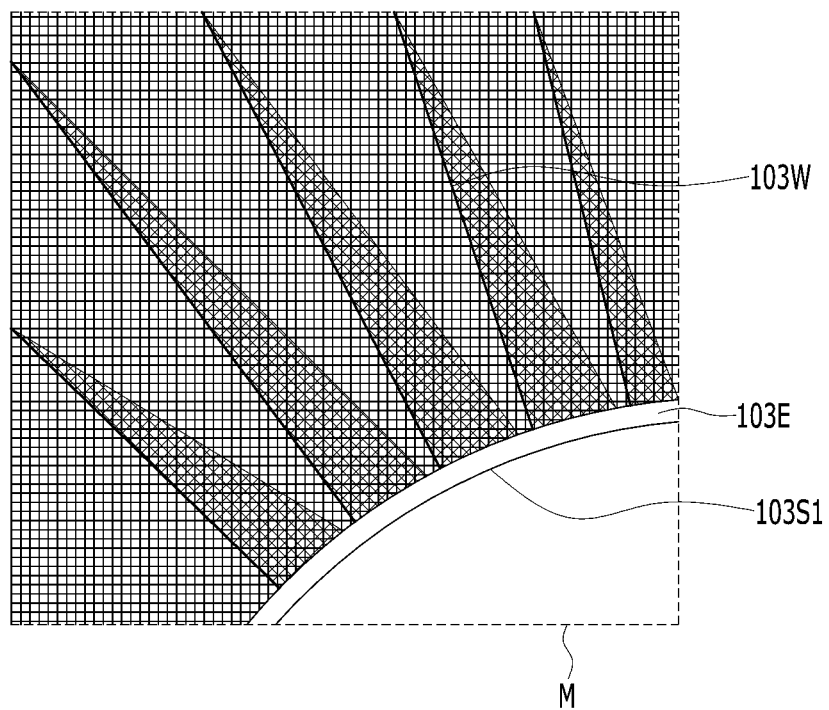
FIG. 8 is a magnified front view illustrating a M portion of the protection net apparatus 10 of FIG. 1.
Figure 9A:
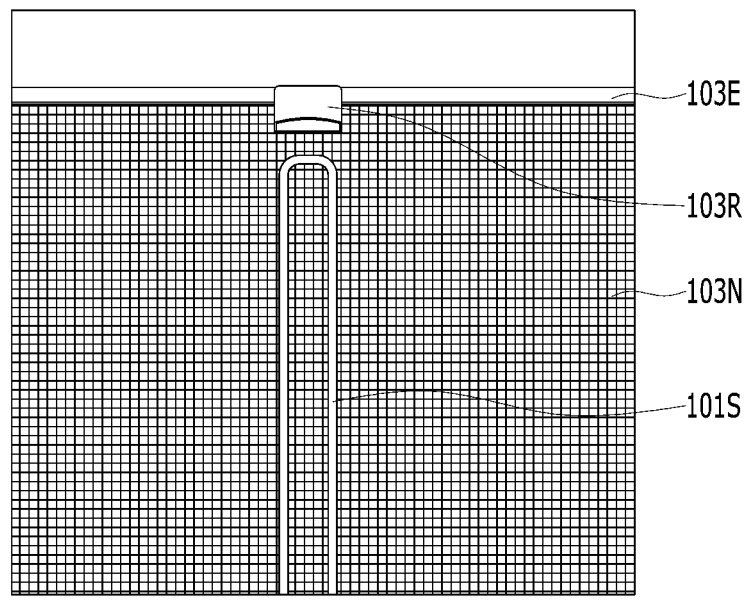
FIGS. 9A and 9B are magnified front and cross sectional views illustrating a receiving pocket 103R of the net part 103 and a supporting rod portion 101S of the net supporting part 101 of the protection net apparatus 10 of FIG. 1 in a state before the supporting rod portion 101S is received into the receiving pocket 103R.
Figure 9B:
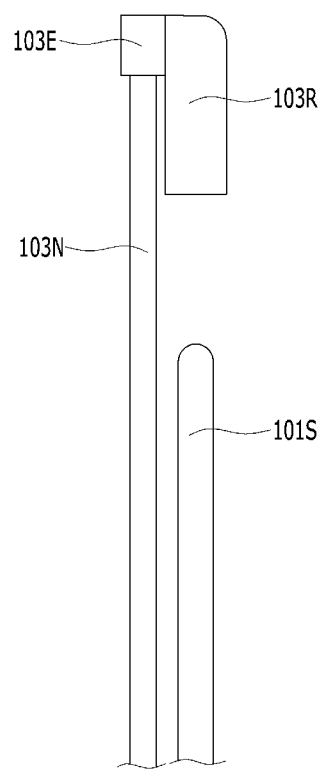
Figure 10A:
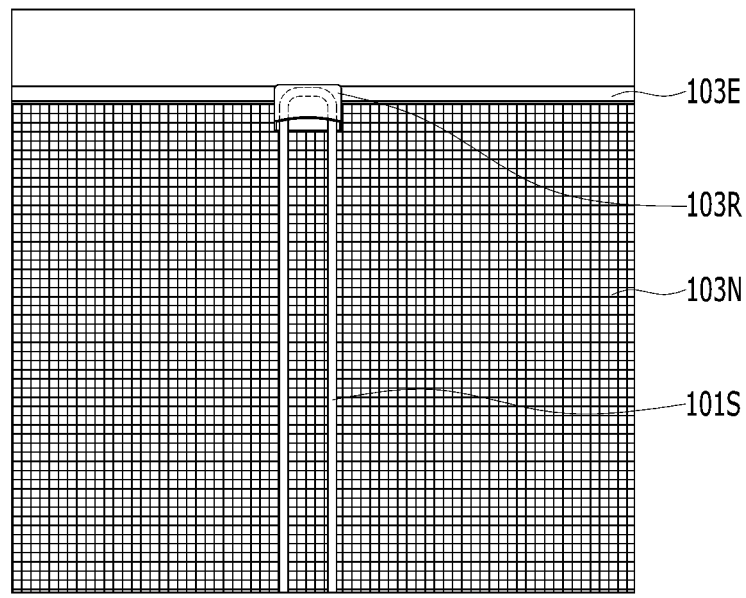
FIGS. 10A and 10B are magnified front and cross sectional views illustrating the receiving pocket 103R and the supporting rod portion 101S in a state when the supporting rod portion 101S is received into the receiving pocket 103R.
Figure 10B:
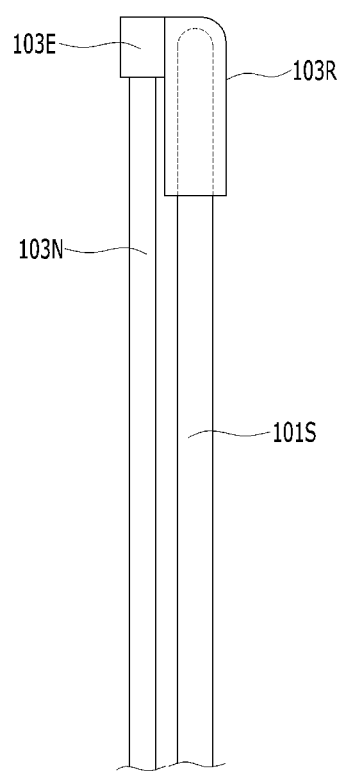

FIGS. 7A and 7B are front and bottom views schematically illustrating a net part 103 of the protection net apparatus 10 of FIG. 1 in a state where the net part 103 is spread out on a plane. FIG. 8 is a magnified front view illustrating a M portion of the protection net apparatus 10 of FIG. 1. FIGS. 9A and 9B are magnified front and cross sectional views illustrating the receiving pocket 103R of the net part 103 and the supporting rod portion 101S of the net supporting part 101 of the protection net apparatus 10 of FIG. 1 in a state before the supporting rod portion 101S is received into the receiving pocket 103R. FIGS. 10A and 10B are magnified front and cross sectional views illustrating the receiving pocket 103R and the supporting rod portion 101S in a state when the supporting rod portion 101S is received into the receiving pocket 103R.

Referring to FIGS. 7A and 7B, the net part 103 including: a net 130N; the receiving pocket 103R attached to a surface of the net 130N at an outer edge portion of the net 103N; and an edge member 103E attached to an edge portion of the net 130N. The net part 103 is mounted on the top end of the supporting rod portion 101S by engaging the top end of the supporting rod portion 101S with the receiving pocket 103R and is spread from the supporting rod portion 101S to the tray CT.

Specifically, the net 130N includes an edge having an inner edge 103S1, an outer edge 103S2 located on an opposite side of the inner edge 103S1, and lateral edges 103S3 each connecting between ends of the inner edge 103S1 and the outer edge 103S2. Referring to FIG. 8 together, the net 130N is folded multiple times along the edge portion in a substantially perpendicular direction to the edge 103S1, 103S2, 103S3 and has net wrinkles 103W. As shown in FIG. 8, some portions of the net 103N may be overlapped by the folds.

Referring to FIGS. 9A to 10B together, the receiving pocket 103R is attached to a surface of the net 130N on the outer edge portion adjacent to the outer edge 103S2 in a direction that an opening of the receiving pocket 103R heads toward the inner edge 103S1. The receiving pocket 103R receives the top end of the supporting rod portion 101S through its opening.

The edge member 103E is attached to the edge portion of the net 130N along the edge 103S1, 103S2, 103S3 in a state where the edge portion is folded in a substantially perpendicular direction to the edge 103S1, 103S2, 103S3. In some embodiments, the edge member 103E is made of a rubber based material having elasticity. The edge member 103E made of a rubber based material can be easily stretched to increase a space of the net part 103 when objects are caught on the net part 103, thereby providing improved objects fall prevention effects.

As the net 130N is folded multiple times, a first length of the edge 103S1, 103S2, 103S3 of the net 130N in a folded state is same as that of the edge member 103E, and a second length of the edge 103S1, 103S2, 103S3 of the net 130N in an unfolded state is longer than that of the edge member 103E. Thus, a first area of the net 130N in the folded state is substantially same as that defined by the inner edge member 103E1, the outer edge member 103E2, and the lateral edge members 103E3, and a second area of the net 130N in the unfolded state is larger than that defined by the inner edge member 103E1, the outer edge member 103E2, and the lateral edge members 103E3. Accordingly, the net part 103 can have an enough space when receiving dropped or thrown objects.

Figure 11A:
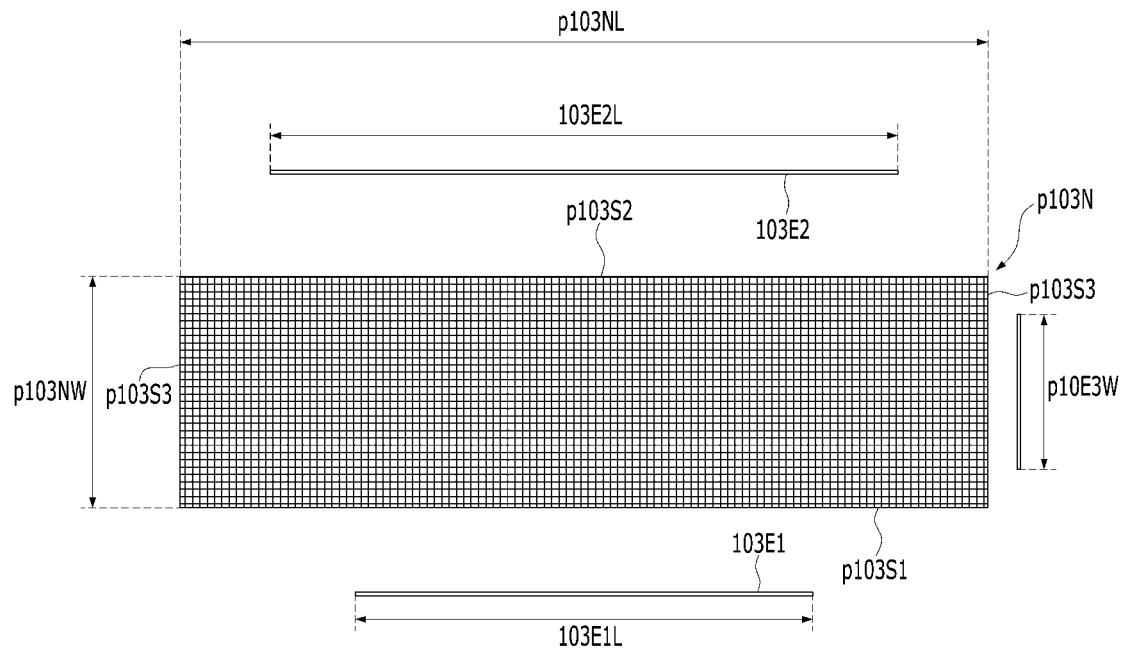
FIGS. 11A and 11B are drawings schematically illustrating a method of manufacturing the net part 103 of the protection net apparatus 10 according to an embodiment of the present invention.
Figure 11B:
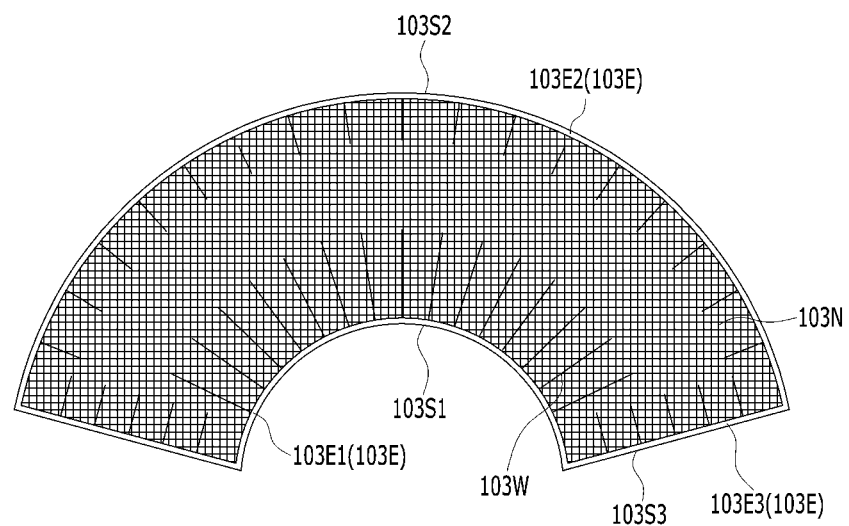

In some embodiments, where the edge member 103E includes an inner edge member 103E1 attached to an inner edge portion adjacent to the inner edge 103S1, an outer edge member 103E2 attached to the outer edge portion adjacent to the outer edge 103E2, and lateral edge members 103E3 each attached to a lateral edge portion adjacent to the lateral edge 103S3, a length of the outer edge member 103E2 may be longer than that of the inner edge member 103E1, as shown in FIGS. 7A and 11B. Accordingly, the net part 103 may have a semi-funnel shape, which further improves object fall prevention effects in that the net part 103 can receive the objects dropped from front and lateral sides.

FIGS. 11A and 11B are drawings schematically illustrating a method of manufacturing the net part 103 of the protection net apparatus 10 according to an embodiment of the present invention.

Referring to FIGS. 7A, 7B, 11A, and 11B, the net 103N is manufactured by using the net fabric p103N, the edge member 103E, and the receiving pocket 103R.

The net fabric p103N may have a rectangular shape with an inner edge p103S1, an outer edge p103S2 located on an opposite side of the inner edge p103S1, and lateral edges p103S3 each connecting between ends of the inner edge p103S1 and the outer edge p103S2. The inner and the outer edge p103S1, p103S2 may have a same length p103NL, and the third and the fourth edge p103S3 may have a same length p103NW which is shorter than the length P103NL.

In FIGS. 11A and 11B, the inner and the outer edge p103S1, p103S2 of the net fabric p103N have the same length, and the lateral edges p103S3 of the net fabric p103N have the same length. However, the present invention is not limited thereto, and the inner and the outer edge p103S1, p103S2 may have different lengths, and the lateral edges p103S3 may have different lengths from each other.

The net fabric p103N may be any fabric, cloth, or textile in which the yarns are fused, looped, or knotted at their intersections. In some embodiments, the net fabric p103N may be any general fabric, cloth, or textile having multiple holes. In this case, the diameter of each hole and the density of the holes may be selected enough to prevent objects from passing therethrough and at the same time, allow a baby to see the outside environment through the net 103N or persons outside the net 103N to see the baby surrounded by the protection net apparatus 10.

After preparing the net fabric p103N, the edge portion of the net fabric p103N may be folded multiple times along the inner edge p103S1, an outer edge p103S2, and lateral edges p103S3. In this case, the edge portion near the inner edge p103S1 may be folded more than that of the outer edge p103S2 but is not limited thereto.

In a state where the edge portion of the net fabric p103N is folded along the edge p103S1, p103S2, p103S3, an inner edge member 103E1 of the edge member 103E may be attached to an inner edge portion adjacent to the inner edge p103S1; an outer edge member 103E2 of the edge member 103E may be attached to the outer edge portion adjacent to the outer edge p103S2; and each of lateral edge members 103E3 of the edge member 103E may be attached to a lateral edge portion adjacent to the lateral edge p103S3. By attaching the edge member 103E to the edge portion of the net fabric p103N in a folded state, net wrinkles 103W formed by the folds are fixed. In other words, the folded form of the net fabric p103N can be fixed. Accordingly, when objects are dropped or thrown to the net part 103, the net wrinkles 103W are unfolded by the weights of the objects, and the net part 103 has an enough a space to receive the objects. Therefore, the objects that a baby drops can be effectively prevented from falling to the floor or ground.

In some embodiments, the inner edge member 103E1 may be shorter than the outer edge member 103E2, and thus, the inner edge portion corresponding to the inner edge 103S1 may have more net wrinkles 103W than the outer edge portion corresponding to the outer edge 103S2, but the present invention is not limited thereto.

As described above, the edge members 103E1, 103E2, 103E3 may be made of a rubber based material with elasticity but are not limited thereto. The edge member 103E1, 103E2, 103E3 may be made of general fabric, cloth, or textile.

Referring to FIG. 7A again, after attaching the edge members 103E1, 103E2, 103E3 to the edge portion of the net fabric p103N, the receiving pocket 103R are attached to the edge portion adjacent to the outer edge 103S2 in a direction that an opening of the receiving pocket 103R heads toward the inner edge 103S1. Accordingly, the net part 103 of the protection net apparatus 10 is manufactured.

Referring to FIGS. 1 and 2 again, the connecting part 105 includes a string 105S each end connected to each of the lateral edges of the net and provides tension to the net 103N by being installed behind a back of the baby chair C that is positioned opposite to the tray CT of the baby chair C.

In some embodiments, the string 105S may include two strings 105S of which each of one ends is connected to each of the lateral edges of the net 103N, and the connecting part 105 may further include a pair of coupling members 105F such as buckles, and each of the coupling member 105F may be connected to each of the other ends of the two strings 105S.

Figure 12:
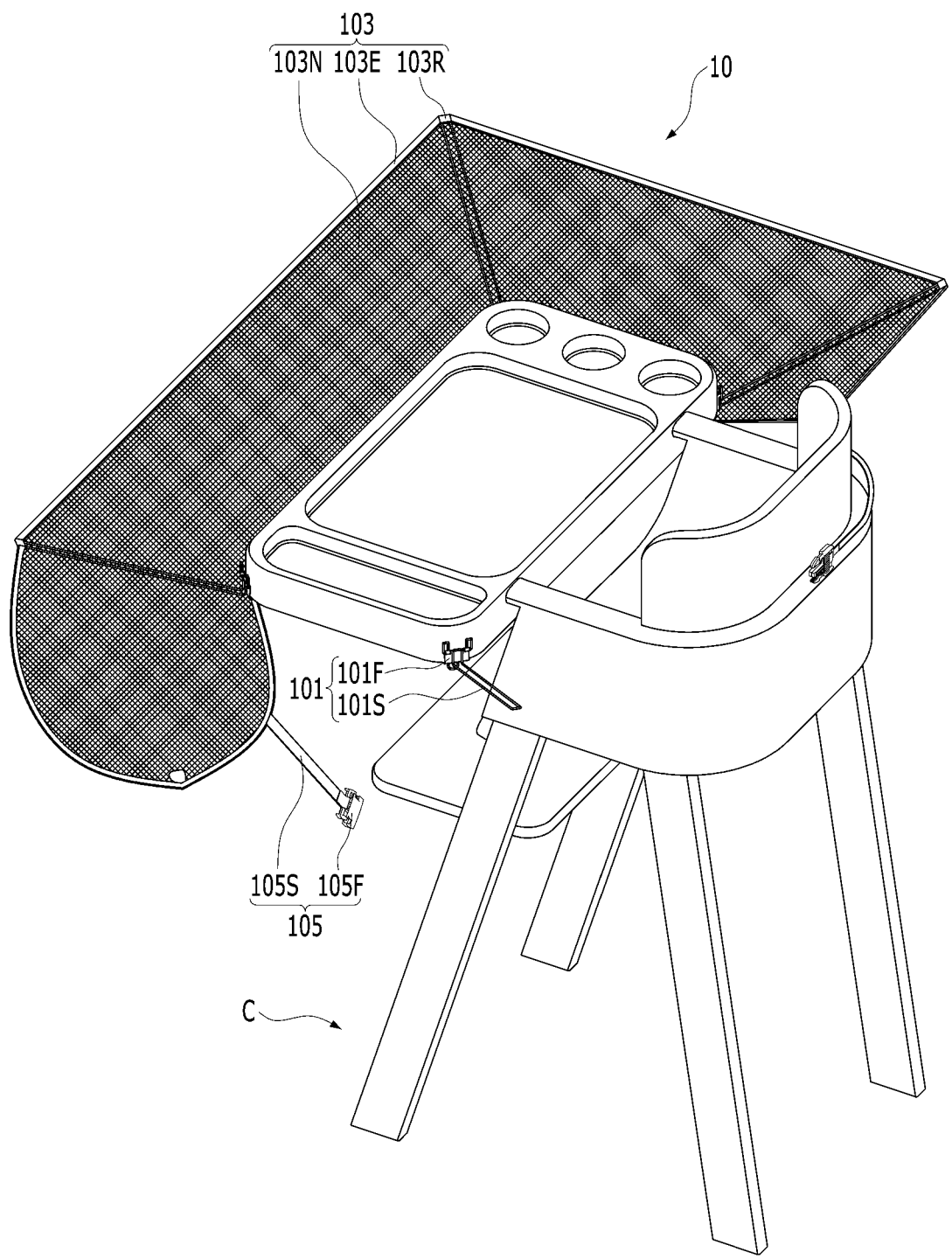
FIG. 12 is a drawing schematically illustrating a process of mounting the net part 103 to the net supporting part 101 of the protection net apparatus 10 according to an embodiment of the present invention.

FIG. 12 is a drawing schematically illustrating a process of mounting the net part 103 to the net supporting part 101 of the protection net apparatus 10 according to an embodiment of the present invention.

Referring to FIGS. 3 and 12, the protection net apparatus 10 may be installed according to the steps of: fixing the plurality of net supporting parts 101 to the different positions of the edge of the tray CT of the baby chair C first by using the clamping position 101F; then mounting the net part 103 on the supporting rod portion 101S by engaging the receiving pocket 103R with the supporting rod portion 101S; and then pulling the string 105S connected to the net part 103 to the back of the baby chair C and fastening the coupling members 105F.

Figure 13:
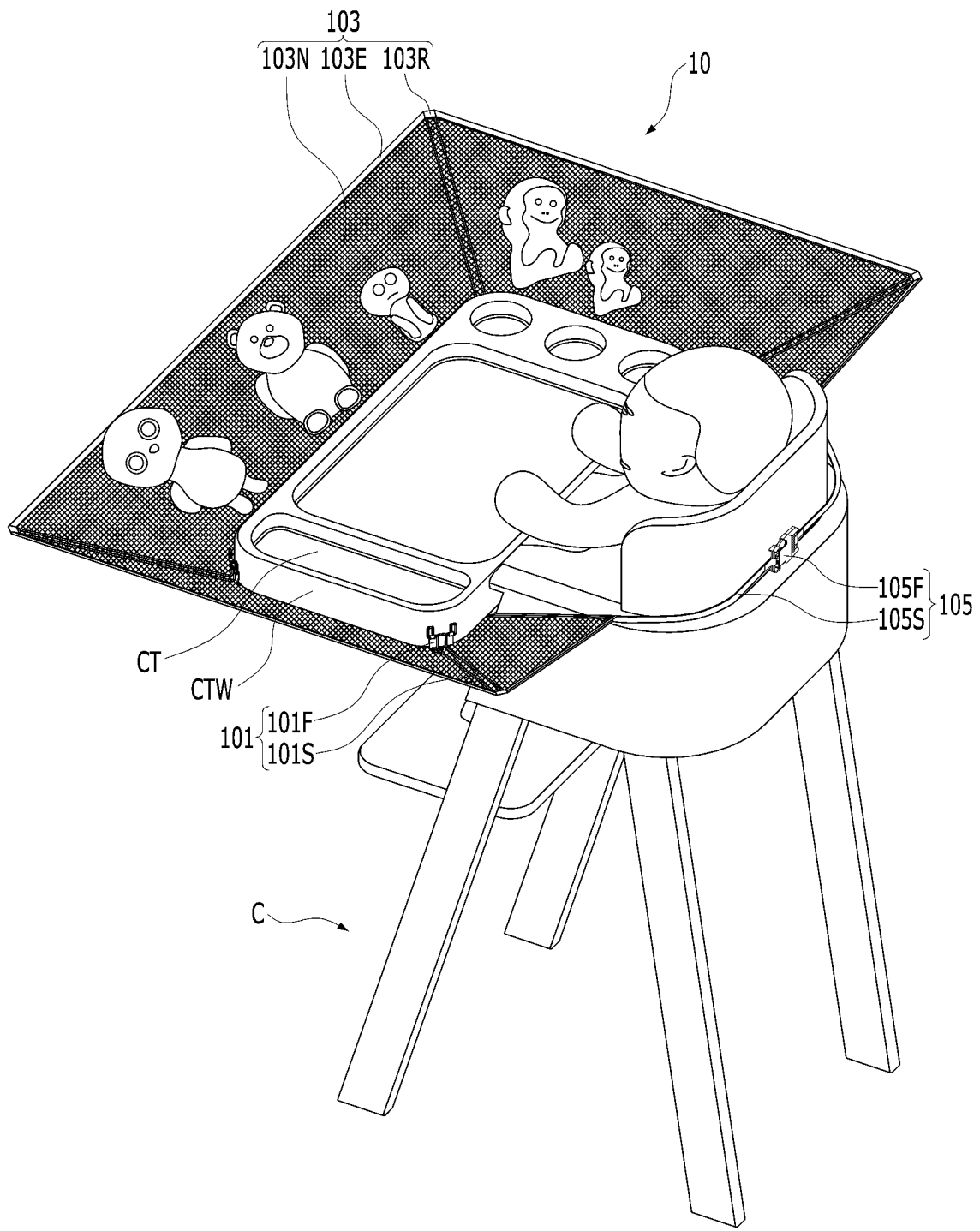
FIG. 13 is a drawing schematically illustrating how the protection net apparatus 10 prevents the baby's items from falling on the floor according to an embodiment of the present invention.

FIG. 13 is a drawing schematically illustrating how the protection net apparatus 10 prevents the baby's items from falling on the floor according to an embodiment of the present invention.

Referring to FIG. 13, when a baby sitting on the baby chair on which the protection net apparatus 10 is installed throws or drops his or her items such as toys or spoons, the protection net apparatus 10 can provide a space to receive them and thus can prevent the objects from falling onto the ground and thus being contaminated with dirt on the floor. In addition, since this object fall prevention effect of the present invention can be achieved in a state that the baby can see the surrounding environment without any obstacles, the use of the protection net apparatus 10 does not cause a baby to have dislikes toward it.

In some embodiments, the baby chair C may have a flat shape. For this type of the baby chair C, an angle of the supporting rod portion 101S from the base portion 101F1 of the protection net apparatus 10 may be chosen to have a range between 90 to 180 degree.

Accordingly, while the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A protection net apparatus for a baby chair having a tray, the protection net apparatus comprising:
    a plurality of net supporting parts fixed to different positions of the tray of the baby chair and each including:
        a clamp portion fixing the net supporting part to the tray; and
        a supporting rod portion coupled to the clamp portion and extending outwards; and
    a net part including:
        a net with an edge having an inner edge, an outer edge located on a side of the net opposite from the inner edge, and lateral edges each connecting between ends of the inner edge and the outer edge; and
        a receiving pocket attached to a surface of the net on an outer edge portion adjacent to the outer edge, wherein an opening direction of the receiving pocket heads toward the inner edge and receives a top end of the supporting rod portion through the opening,
    wherein the clamp portion includes:
        a body having a U shape and clamping the tray through an opening of the U shape;
        a handle connected to a bottom of the body and protruding from the body in a direction opposite to a direction of opening of the U shape;
    wherein the tray has a top surface portion on which objects are laid out and a side wall portion protruding downwards from an edge of the top surface portion,
    wherein the body clamps the side wall portion from a bottom of the side wall portion in a direction where the handle is positioned to be on an inner side of the side wall portion and the base portion is positioned to be on an outer side of the side wall portion, and
    wherein the net part is mounted on the supporting rod portions by engaging a top end of the supporting rod portion with the receiving pocket and spreading the net from the top end of the supporting rod portion to the tray.

2. The protection net apparatus of claim 1, wherein the clamp portion includes:
    a base portion extended from a bottom end of the supporting rod portion, connected to a top of the body, and protruding from the body in the direction of opening and resting against a surface of the tray, thereby providing a fixing force to the supporting rod portion.

3. The protection net apparatus of claim 2, wherein the base portion and the supporting rod portion are one body made of stainless steel.

4. The protection net apparatus of claim 2,
    wherein the base portion is configured to be substantially parallel to a surface of the side wall portion of the tray, and an angle between the base portion and the supporting rod portion ranges between 0 and 90 degree.

5. The protection net apparatus of claim 2, wherein an angle between the base portion and the supporting rod portion of at least one of the net supporting parts is different from that between the base portion and the supporting rod portion of another one of the net supporting parts.

6. The protection net apparatus of claim 2, wherein a length of the supporting rod portion of at least one of the net supporting parts is different from that of the supporting rod portion of another one of the net supporting parts.

7. The protection net apparatus of claim 1, further comprising an edge member that is attached to an edge portion of the net along the edge in a state where the edge portion is folded to create fold lines that are substantially perpendicular to the edge.

8. The protection net apparatus of claim 7, wherein a first length of the edge of the net in a folded state is the same as that of the edge member, and a second length of the edge of the net in an unfolded state is longer than that of the edge member.

9. The protection net apparatus of claim 7, wherein a first area of the net in the folded state is substantially the same as that defined by the inner edge, the outer edge, and the lateral edge, and a second area of the net in the unfolded state is larger than that defined by the inner edge, the outer edge, and the lateral edge.

10. The protection net apparatus of claim 9, wherein the edge member includes an inner edge member attached to an inner edge portion adjacent to the inner edge, an outer edge member attached to the outer edge portion adjacent to the outer edge, and lateral edge members each attached to a lateral edge portion adjacent to the lateral edge,
wherein a length of the outer edge member is longer than that of the inner edge member.

11. The protection net apparatus of claim 10, wherein the edge member is made of a rubber based material having elasticity.

12. The protection net apparatus of claim 1,
wherein at least one of the net supporting parts has different shapes from the others with respect to at least one of an angle of the supporting rod portion from the clamp portion and a length of the supporting rod portion.

13. The protection net apparatus of claim 1, further comprising a connecting part that includes a string, each end of which is connected to the lateral edges of the net respectively, and that provides tension to the net by being installed behind a back of the baby chair that is positioned opposite to the tray of the baby chair.

14. A protection net apparatus fixed to a baby chair having a tray, the protection net comprising:
a plurality of net supporting parts fixed to different positions of the tray and each including:
a clamp portion fixing the net supporting part to the tray and including:
a body having a U shape and clamping the tray through an opening of the U shape;
a handle connected to the body and protruding from the body in a direction opposite to a direction of opening of the U shape; and
a base portion connected to the body, protruding from the body in the direction of opening, and resting against the tray; and
a supporting rod portion coupled to and extended from the clamp portion outwards and fixed at one position by a fixing force provided by the base portion; and
a net part including:
a net with an edge;
an edge member attached to an edge portion of the net along the edge in a state where the edge portion is folded to create fold lines that are substantially perpendicular to the edge; and
a receiving pocket attached to an outer edge portion of the edge portion, wherein an opening direction of the receiving pocket heads toward an inner edge portion located on an opposite side of the protection net from the outer edge portion and receives the supporting rod portion through the opening; and
a connecting part that includes a string, each end of which is connected to the lateral edges of the net respectively, and provides tension to the net by being installed behind a back of the baby chair that is positioned opposite to the tray;
wherein the tray has a top surface portion on which objects are laid out and a side wall portion protruding downwards from an edge of the top surface portion, and
wherein the body clamps the side wall portion from a bottom of the side wall portion in a direction where the handle is positioned to be on an inner side of the side wall portion and the base portion is positioned to be on an outer side of the side wall portion.

15. The protection net apparatus of claim 14,
wherein the base portion is configured to be substantially parallel to a surface of the side wall portion of the tray, and an angle between the base portion and the supporting rod portion ranges between 0 and 90 degree.

16. The protection net apparatus of claim 14, wherein a first length of the edge of the net in a folded state is the same as that of the edge member, and a second length of the edge of the net in an unfolded state is longer than that of the edge member.

17. The protection net apparatus of claim 14, wherein a first area of the net in the folded state is substantially the same as that defined by the inner edge, the outer edge, and the lateral edge, and a second area of the net in the unfolded state is larger than that defined by the inner edge, the outer edge, and the lateral edge.

18. The protection net apparatus of claim 17, wherein the edge member includes an inner edge member attached to an inner edge portion, an outer edge member attached to the outer edge portion, and lateral edge members attached to a lateral edge portion between the inner and the outer edge portion,
wherein a length of the outer edge member is longer than that of the inner edge member.

19. The protection net apparatus of claim 17, wherein the edge member is made of a rubber based material having elasticity.

20. The protection net apparatus of claim 14, wherein at least one of the net supporting parts has different shapes from the others with respect to at least one of an angle of the supporting rod portion from the clamp portion and a length of the supporting rod portions from the clamp portion.

* * * * *